United States Patent
Amendolagine

(10) Patent No.: US 9,396,001 B2
(45) Date of Patent: Jul. 19, 2016

(54) WINDOW MANAGEMENT FOR AN EMBEDDED SYSTEM

(75) Inventor: James Amendolagine, San Marcos, CA (US)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 13/191,920

(22) Filed: Jul. 27, 2011

(65) Prior Publication Data

US 2012/0117508 A1    May 10, 2012

Related U.S. Application Data

(60) Provisional application No. 61/411,102, filed on Nov. 8, 2010.

(51) Int. Cl.
    *G06F 3/048*    (2013.01)
    *G06F 9/44*    (2006.01)

(52) U.S. Cl.
    CPC ..................... *G06F 9/4443* (2013.01)

(58) Field of Classification Search
    None
    See application file for complete search history.

(56) References Cited

U.S. PATENT DOCUMENTS

| | | | |
|---|---|---|---|
| 5,451,981 A * | 9/1995 | Drako et al. | 345/620 |
| 7,103,873 B2 | 9/2006 | Tanner et al. | |
| 7,511,718 B2 | 3/2009 | Subramanian et al. | |
| 2002/0049930 A1 * | 4/2002 | Hannigan | 714/39 |
| 2004/0189668 A1 * | 9/2004 | Beda et al. | 345/619 |
| 2005/0088447 A1 * | 4/2005 | Hanggie et al. | 345/545 |
| 2006/0048164 A1 * | 3/2006 | Fry et al. | 719/328 |
| 2006/0206825 A1 * | 9/2006 | Dorn et al. | 715/761 |
| 2007/0192818 A1 | 8/2007 | Bourges-Sevenier et al. | |
| 2008/0284798 A1 * | 11/2008 | Weybrew | G06T 15/503 345/630 |
| 2009/0013282 A1 * | 1/2009 | Mercer | 715/788 |
| 2010/0085367 A1 * | 4/2010 | Jeong et al. | 345/520 |
| 2010/0235777 A1 * | 9/2010 | Herz et al. | 715/778 |
| 2010/0289804 A1 | 11/2010 | Jackman et al. | |

OTHER PUBLICATIONS

"NAF, the SNAP graphics subsystem," Sony Technical Symposium 2010, Amendolagine, James.

* cited by examiner

*Primary Examiner* — William Trapanese
(74) *Attorney, Agent, or Firm* — Fitch, Even, Tabin & Flannery LLP

(57) ABSTRACT

Methods and apparatus are provided for providing a window management system for an embedded system. In one embodiment a method includes configuring an operating system of an embedded system based on a protocol provided between one or more application windows and a window manager, each application window associated with an application executed by the operating system, storing display content of the one or more application windows in a buffer, and compositing the one or more application windows in the buffer. The method may further include outputting data of the buffer for display of the one or more application windows based on the compositing, wherein an application programming interface is specified for the application to directly access graphics hardware of the embedded system.

31 Claims, 3 Drawing Sheets

WINDOW MANAGEMENT FOR AN EMBEDDED SYSTEM

CROSS REFERENCE TO RELATED APPLICATION

This application claims priority to U.S. Provisional Patent Application Ser. No. 61/411,102, Filed Nov. 8, 2010 entitled "NAF, The SNAP graphics subsystem", the disclosure of which is hereby fully incorporated by reference.

FIELD

The present disclosure relates generally to electronic device and display applications, and more particularly to an application framework to provide window management for an embedded system.

BACKGROUND

The configuration of many electronic devices is often associated with the framework of a particular developer or manufacturer of the device processor. For example, it is widely known that certain desktop systems or operating systems employ a particular framework for an application to operate with the operating system. Few open source solutions, however, allow for embedded multi-process window systems to scale from low-end to high end graphics systems. There exists a need for an improved solution to provide a window system for embedded systems, and in particular for open source solutions. Three convention solutions include the X11, DirectFB, and Wayland frameworks.

The X11 project started in 1984 out of Project Athena. Much of the original design remains and is generally considered an awkward fit for modern graphics systems. Regarding embedded systems, X11 is generally considered as a bad fit because of its size and complexity. With current embedded systems, size may no-longer be a big issue, but systems problems stemming from the complexity of X11 remain an issue.

DirectFB 1.x is designed to unify access to Linux framebuffer devices. It provides a drawing application programming interface, unique to DirectFB, which is a superset of unique accelerate graphics application programming interface exposed by each Linux frame-buffer device driver. Support for DirectFB by open standard drawing application programming interfaces is weak, and DirectFB implements its own graphics buffer management. Although improved graphics are proposed for later versions of DirectFB, an incompatible re-write will most likely result in the framework and depreciate the application programming interface.

Wayland provides many desirable requirements for window management, but development of Wayland is not mature enough to provide a window management system. Its dependencies are difficult to implement on an embedded system that a network application program is likely to be run on. In additional, Wayland uses existing technologies in the Linux kernel mode-setting (KMS) and the Graphics Execution Manager (GEM) batchbuffer in order to provide a minimal display server.

Accordingly, there is a desire for a graphics framework and embedded windowing system for an network application program to provide useful technological solutions and functionality that may improve graphics quality.

BRIEF SUMMARY OF THE EMBODIMENTS

Disclosed and claimed herein are methods and apparatus for providing a window management system for an embedded system. In one embodiment, a method includes configuring an operating system of an embedded system based on a protocol provided between one or more application windows and a window manager, each application window associated with an application executed by the operating system, and storing, by a device, display content of the one or more application windows in a buffer. The method further includes compositing, by the device, the one or more application windows in the buffer, and outputting data of the buffer for display of the one or more application windows based on the compositing, wherein an application programming interface is specified for the application to directly access graphics hardware of the embedded system.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
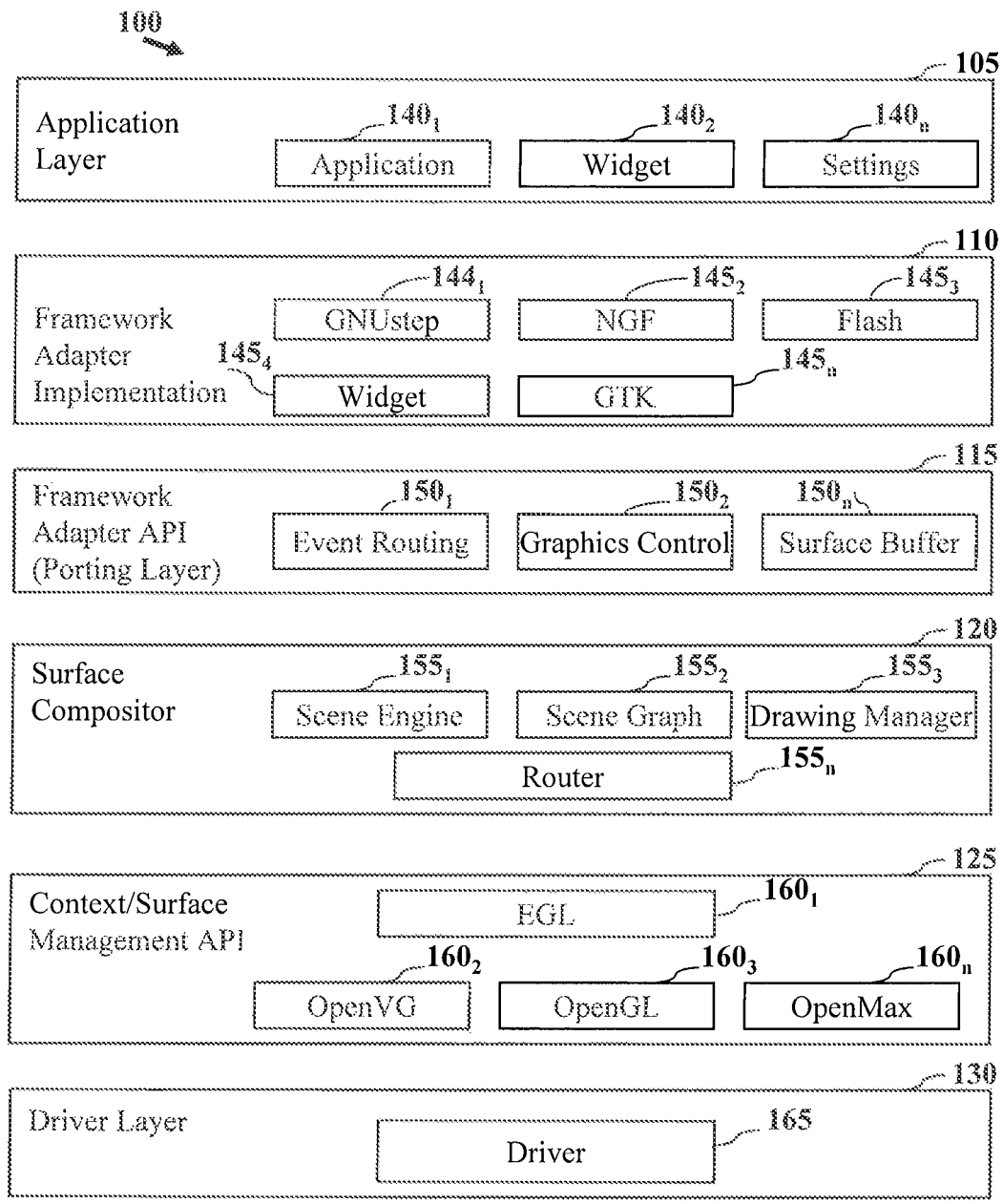
FIG. 1 depicts a graphical representation of a window management system according to one or more embodiments.

One aspect of the of the disclosure relates to a window management system for a network application framework. The window management system may be provided for an embedded system to allow for a multi-process graphics hardware accelerated design. Methods and apparatus are provided for configuring an operating system of an embedded system based on a protocol provided between one or more application windows and a window manager. The protocol may include a plurality of layers for framework adaption of an application programming interface, surface compositing and surface management. In another embodiment, a device is provided which may be configured to present one or more windows of an application based on a window management system framework.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The code segments can be stored in a processor readable medium, which may include any processor readable, or non-transitory, medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, non-transitory medium, etc.

Exemplary Embodiments

Referring now to the figures, FIG. 1 depicts a graphical representation of a window management system which may be employed by one or more embodiments described herein. Window management system 100 may be an application framework to provide a window system for an embedded system and can be configured for multi-process, graphics hardware accelerate, scalable, extensible, and portable windowing system according to one or more embodiments. Window management system 100 may relate to a framework developed for an open source operating system, such as Linux based operating systems, to allow for high performance windowing. One advantage of window management system 100 may be to provide direct access to graphics application programming interfaces (API's). Window management system 100 may similarly provide for specialized presentation and management of one or more windows associated with external application frameworks. Window management system 100 may additionally relate to a network application framework that is multi-process, and that handles keyboard, mouse, and multi-touch input.

Window management system 100 can allow for window management of one or more applications. FIG. 1 depicts applications 105, the display of which may be managed by window management system 100. Each application managed by window management system 100 can include one or more windows for display. Window management system 100 allows for presentation of applications windows which are not provided by an embedded operating system. By way of example, some devices running embedded operating systems, such as open source operating systems, may not provide a rich or interesting presentation of applications. Other conventional frameworks are either difficult to implement or lacking one or more desired capabilities. However, window management system 100 can provide presentation of application windows to allow for high performance modern windowing on such embedded systems. The window management system 100 allows for framework adapter implementation 110 (e.g., a port layer) to allow an embedded operating system to execute one or more programs. Framework adapter implementation 110 allows for an application to run on a device and may provide one or more libraries. Applications and libraries can have direct access to hardware accelerated graphics APIs including EGL, OpenGL-ES, and OpenVG. The multi-process applications may communicate with a window server of window management system 100 through inter process communication of the embedded system that can be extended to support a remote use interface. The window server of window management system 100 may support two or more window management modes including full 3D window management, and emulated 3D window management that only requires 2D hardware. The window manager composition can be extended by the window manager plug-in that has direct access to window system APIs.

Window management system 100 provides access of each application to access to graphics API's and window system events from the applications and application libraries to graphics hardware elements. Window management system 100 includes framework adapter API 115, surface compositor 120, context/surface management API 125, and driver layer 130. Window management system 100 can specify a drawing API for the presentation of one or more windows. As depicted in FIG. 1, applications $140_{1-n}$ may have direct access to graphics hardware provided by driver layer 130 based on the specified drawing API. In one exemplary embodiment, window management system 100 specifies the Kronos open API (e.g., the EGL, OpenGL-ES, and Open VG graphics standards). The specified API may be embedded into graphics chips employed by devices utilizing window management system 100. The specified API may be employed for presenting windows for applications $140_{1-n}$. As depicted in FIG. 1, applications $140_{1-n}$ relate to application $140_1$, widget $140_2$, and settings $140_n$. Each of applications $140_{1-n}$ may include one of more windows for display by a device having embedded operating system. Applications $140_{1-n}$ may relate to one or more applications for a device including but not limited to games, widgets (weather, new, traffic, etc.), remote controls, social applications, media sharing applications, communication devices, media players, entertainment devices, home automation, etc.

Framework adapter implementation layer 110 may relate to a framework for applications executed by the embedded operating system, such as a port layer. Elements $145_{1-n}$ of framework adapter implementation layer 110 are depicted as including GNUstep $145_1$, NGF $145_2$, flash $145_3$, widget $145_3$, and GTK $145_n$. GNUstep $145_1$ is a native object-oriented application programming interfaces (APIs). NGF $145_2$ relates to a network game framework for presenting a gaming application. Flash $145_3$ relates to cross-platform browser plug-in. Widget $145_3$ relates to an application for providing a interactive virtual tool to a provide single-purpose services or user desired applications. GTK $145_n$ relates to multi-platform toolkit for creating graphical user interfaces. It should also be appreciated that framework adapter implementation layer 110 of window management system 100 may include one or more other, or different application adapters relative to elements $145_{1-n}$ depicted in FIG. 1.

Framework adapter API 115, surface compositor 120, context/surface management API 125, and driver layer 130 may be configured to allow for direct access to graphics hardware for applications $145_{1-n}$ to allow for presentation of windows associated with applications $140_{1-n}$.

Framework adapter API 115 provides specific libraries to run applications $140_{1-n}$. As depicted in FIG. 1, framework adapter API 115 includes framework adapters for event routing $150_1$, graphics control $150_2$, and surface buffer $150_n$. The framework adapters allow applications which already provide for a specific API, such as their own API, to run with window management system 100. For example, widget applications with their own API's may be adapted by framework adapter API 115.

Surface compositor 120 may act as a meta-abstraction layer and may aid developers for presentation of windows and includes libraries. Surface compositor 120 may further act as a window manager to display application windows in a 3D space, an emulated 3D windowing mode, or 2D mode. As depicted in FIG. 1, surface compositor 120 includes scene engine $155_1$, scene graph $155_2$, drawing manager $155_3$, and router $155_n$. Surface compositor 120 may utilize lower layers of window management system 100 like OpenGL $160_3$ to drawings windows on a screen. Surface compositor may draw applications windows into a buffer while context/surface management API 125 draws windows on a display screen.

Context/surface management API 125 may be configured to provide a scene engine for windows. As depicted in FIG. 1, context/surface management API 125 includes EGL $160_1$, OpenVG $160_2$, OpenGL $160_3$, and OpenMax $160_n$. Context/surface management API 125 may be provided by specifying an API. For example, context/surface management API 125 may specify the Kronos API.

Driver layer 130 may be the implementation of the standards of the EGL to allow for access to graphics hardware of applications via one or more drivers depicted as 165.

Figure 2:
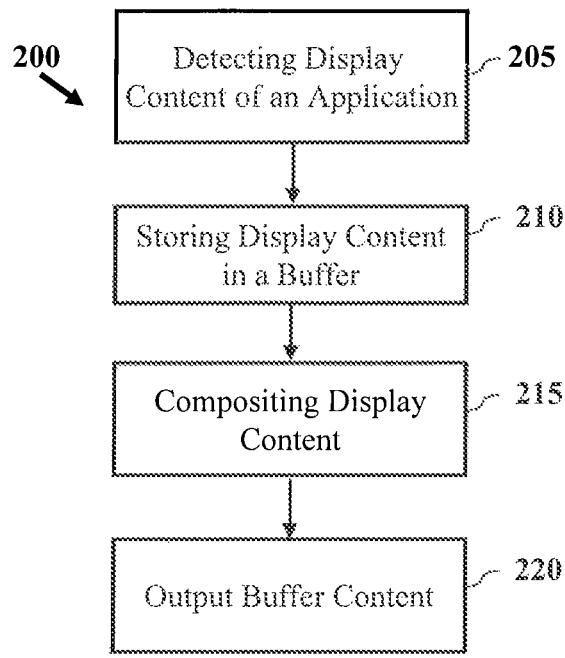
FIG. 2 depicts a process for window management of an embedded operating system according to one or more embodiments.

Referring now to FIG. 2, a process is depicted for window management of an embedded operating system according to one or more embodiments. Process 200 may be employed by an embedded system for presentation of one or more applications to a user.

Process 200 may be initiated by configuring an operating system of an embedded system based on a protocol provided between one or more application windows and a window manager at block 205. Each application window is associated with an application executed by the operating system. The embedded system may be multi-process graphics system.

According to one embodiment, the embedded system may operate based on a protocol, such as the window management system of FIG. 1. The protocol may expose a specified application programming interface to each layer of the protocol including application and application libraries of the embedded system. In that fashion, direct access may be provided to graphics hardware from applications and application libraries to provide quality graphical output. The protocol may additionally allow for a remote procedure call (RPC) protocol between application client window, and a window server of the embedded system.

Window management system 100 may be configured to host external application frameworks such as GNUstep, Java JDK, Yahoo widgets, GTK, X2, X11, etc. This may be accomplished through a specialization of an abstract adapter module which sits between the application framework, and the window system. This adapter provides and adapts access to graphics API's and window system events.

Window management system 100 may be applied to a Linux PC platform, the Sigma, the Beagle board, and other embedded systems.

According to one embodiment, process 200 may be based on the window management system of FIG. 1. Process 200 may be based on a protocol that provides framework adaption to adapt display framework of an application for display by the window manager, surface management to provide drawing of application windows, and/or a framework adapter to provide application libraries.

At block 210, process 200 may continue by storing display content of the one or more application windows in a buffer. An application window may relate to a viewing area for display of a graphical user interface of an application. The buffer may relate to a screen buffer for providing graphic and video output. The application windows in the buffer may be composited at block 215. In one embodiment, application windows may be composited by double buffering and may provide tear free window content. Compositing may provide one or more of full three dimensional (3D), emulated 3D and two-dimensional (2D) content.

At block 220, data of the buffer of the one or more application windows may be output for display based on the compositing, wherein an application programming interface is specified for the application to access graphics hardware of the embedded system.

Figure 3:
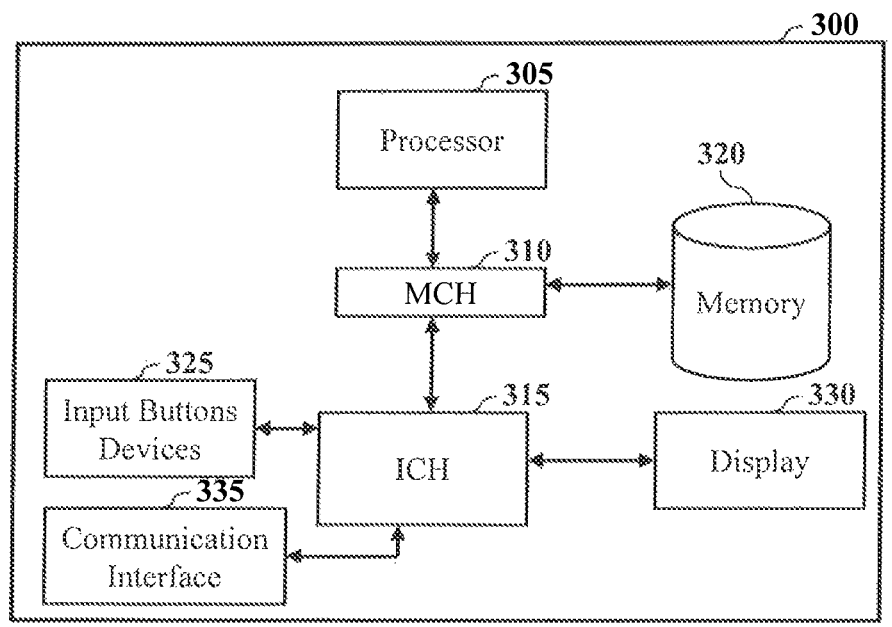
FIG. 3 depicts a simplified block diagram of a device according to one embodiment.

Referring now to FIG. 3, a simplified block diagram is depicted of a device according to one embodiment. Device 300 may relate to an embedded device system configured to provide graphical content. Device 300 may relate to one or more of a display device, personal communication device, media player, gaming device, etc. In certain embodiments, device 300 may relate to a peripheral device configured to interface with a display device, such as a media player, etc. As depicted in FIG. 3, device 300 includes processor 305, memory controller hub (MCH) 310, input/output controller hub (ICH) 315, memory 320, input/output (I/O) interface 325, display 330, and communication interface 325. Elements of device 300 may be configured to communicate and interoperate by a communication bus.

Processor 305 may be configured to control operation of device 300 based on one or more computer executable instructions stored in memory 320. In one embodiment, processor 305 may be configured to control display of image, graphics and video content. Processor 305 may also provide a plurality of user control features. Processor 305 may be configured to interoperate with MCH 310 and ICH 315 to provide a window management system. MCH 310 may be configured as a communication interface between processor 305 and memory 320. ICH 315 may be configured to connect with and control one or more peripheral devices. Memory 320 may relate to one of RAM and ROM memories and may be configured to store one or more files, and computer executable instructions for operation of device 300. Although depicted as a single memory unit, memory 320 may relate to one or more of internal device memory and removable memory. Memory 320 may store one or more applications and application libraries.

I/O interface 325 may be employed to control operation of device 300 including controlling selection of content for display and controlling operation of device 300. I/O interface 325 may include one or more buttons for user input, such as a such as a numerical keypad, volume control, menu controls, pointing device, track ball, mode selection buttons, and playback functionality (e.g., play, stop, pause, forward, reverse, slow motion, etc). Buttons of I/O interface 325 may include hard and soft buttons, wherein functionality of the soft buttons may be based on one or more applications running on device 300. Display 330 may be employed to display image data, such as video data, and display one or more applications executed by processor 305. In certain embodiments, display 330 may relate to a touch screen display.

MCH 310 may include a buffer configured to drive display of image and graphic data. In one embodiment, a buffer of MCH 310 may be configured to store image data prior to display. In certain embodiments, processor 305 may be configured to analyze image data stored by a buffer of MCH 310 may to for window management.

Communication interface 335 may include one or more elements to allow for communication of device 300 by wired or wireless communication. Communication interface 335 may include one or more ports for receiving data, including ports for removable memory. Communication interface 335 may be configured to allow for network based communications including but not limited to LAN, WAN, Wi-Fi, etc.

Figure 4:
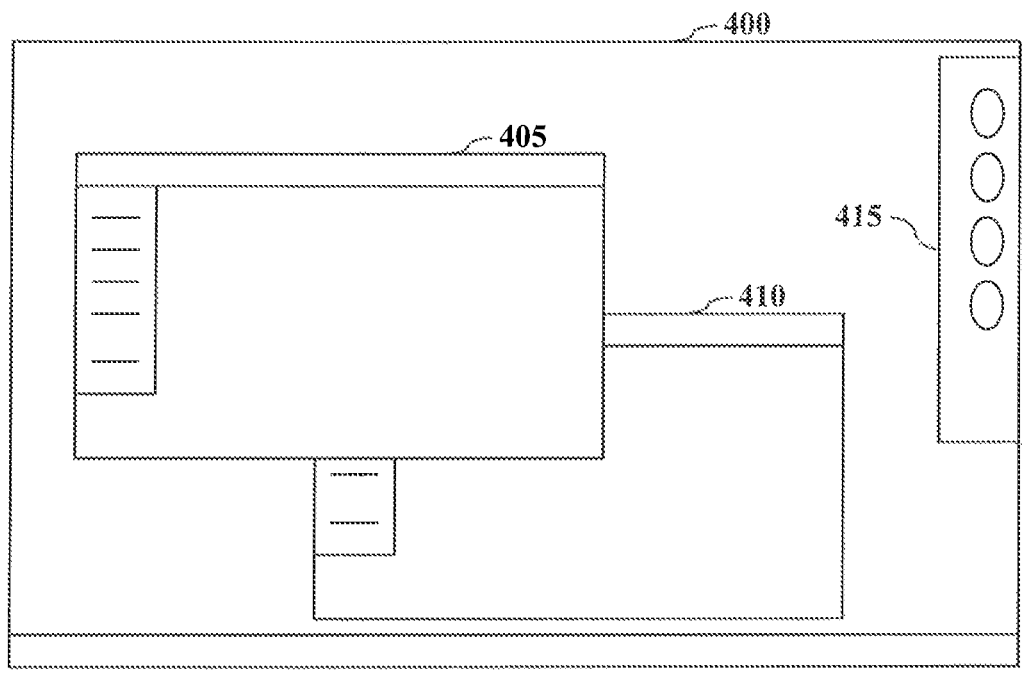
FIG. 4 depicts a graphical representation of a user interface of an operating system of an embedded device.

Referring now to FIG. 4, a graphical representation is depicted of a user interface of an operating system of an embedded device. User interface 400 may be displayed by a display of an embedded device, or a display electrically coupled to the embedded device. User interface 400 includes windows 405 and 410. Windows 405 and 410 may be associated with one or more applications, such as games, widgets (weather, new, traffic, etc.), remote controls, social applications, media sharing applications, communication devices, media players, entertainment devices, home automation, etc. In certain embodiments, user interface 400 may output multiple windows for a single application. User interface 400 additionally includes a graphical representation of a widget depicted as 415. Widget 415 may include one or more graphical elements which may be selected by a user of the embedded device. Window content may be composited double buffered, and tear free. In certain embodiments, the window management system may provide window content on a per pixel basis and per-window alpha blended.

According to one embodiment, graphical representation of user interface 400 may be based on a window management system of FIG. 1. The window management system may be based on a protocol to allow for direct access of applications to graphics hardware. The window management system may control presentation of one or more of window 405, window 410 and widget 415. Multi-process functionality may be provided by a remote procedure call protocol between application client window, and a window server of a window management system. To allow for a multi-process graphics system extensions in an EGL specification may be employed. As such, the window manager may be configured to be specialized for multiprocessing on each platform in situations where an EGL specification is not provided, a graphics RPC wire protocol may be integrated using protocol buffers or by integrating open source components with their own graphics wire protocol. The window manager may support two windowing modes—full 3D and emulated 3D. Window content may be stored in off-screen buffers, and the window manager may composite those buffers to the screen. Each mode may use a hierarchical scene graph to composite the windows to the screen. The hierarchy of the scene-graph may be determined on the parent child relationship of windows, where child windows are located relative to parent windows. The 3D window manager may display windows in full 3D space from a movable camera position. In the emulated 3D windowing mode, the camera, and the windows are also located in a 3D space, but the windows are always oriented, screen aligned, facing the camera.

Figure 5:
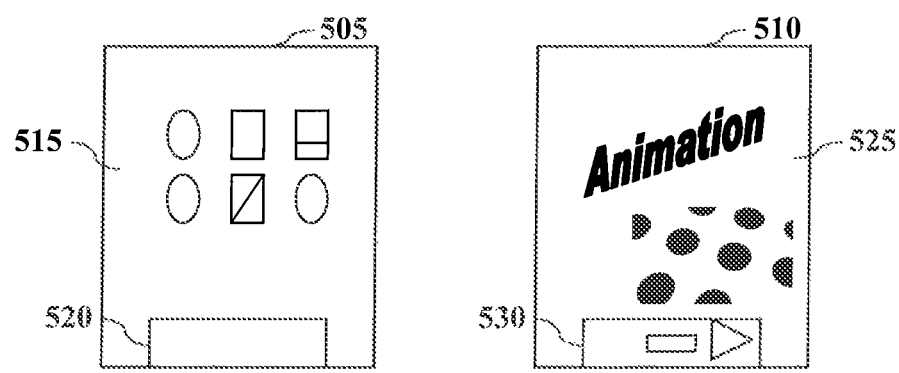
FIG. 5 depicts a graphical representation a graphical representation of a display windows according to one or more embodiments.

According to another embodiment, a window management system may control transition of display windows for an embedded device. Referring now to FIG. 5, a graphical representation of a display windows 505 and 510 and depicted according to one or more embodiments. Display of window 505 and window 510 may be based on the window management system of FIG. 1. Window 505 may relate to a home or desktop view of the embedded device to include one or more selectable elements depicted as 515 and control bar 520. Based on user commands, the device may display window 510 of an application including graphical elements 525 and control bar 530. Content of display window 505 and display window 510 may be stored in a buffer and may be displayed by a window management system of the embedded system. According to one embodiment, display of window 505 or window 510 may be displayed using the process of FIG. 2.

While this disclosure has been particularly shown and described with references to exemplary embodiments thereof, it will be understood by those skilled in the art that various changes in form and details may be made therein without departing from the scope of the embodiments encompassed by the appended claims.

What is claimed is:

1. A method for providing a window management system for an embedded system, the method comprising the acts of:
   configuring an operating system of an embedded system based on a protocol provided between application windows and a window manager, each of the application windows associated with an application executed by the operating system, the protocol including a port layer configured to permit the embedded system to execute the application;
   storing, by a device, display content of at least two of the application windows in one buffer;
   compositing, by the device, the at least two of the application windows in the buffer; and
   outputting data of the buffer for display of the at least two of the application windows based on the compositing, wherein a drawing application programming interface is specified for the application to directly access graphics hardware of the embedded system via an Embedded-System Graphics Library (EGL) interface-implemented driver layer based on the specified drawing application programming interface, the driver layer including one or more drivers configured to allow the application to directly access the graphics hardware of the embedded system.

2. The method of claim 1, wherein the embedded system is a multi-process graphics system.

3. The method of claim 1, wherein the protocol exposes the specified drawing application programming interface to each layer of the protocol including application and application libraries of the embedded system.

4. The method of claim 1, wherein the protocol includes a remote procedure call protocol.

5. The method of claim 1, wherein the protocol provides framework adaption to adapt display framework of an application for display by the window manager.

6. The method of claim 1, wherein the protocol provides surface management to provide drawing of the application windows.

7. The method of claim 1, wherein the protocol provides a framework adapter to provide application libraries.

8. The method of claim 1, wherein the buffer relates to a screen buffer for providing graphic and video output.

9. The method of claim 1, wherein an application window relates to a viewing area for display of a graphical user interface of an application.

10. The method of claim 1, wherein the compositing of the at least two of the application windows is double buffered and provides tear free window content.

11. The method of claim 1, wherein compositing provides full three dimensional (3D), emulated 3D and two-dimensional (2D) content.

12. The method of claim 1, wherein the compositing further comprises using a hierarchical scene graph to composite the at least two of the application windows to the screen, a hierarchy of the scene graph being determined on a parent-child relationship of the at least two of the application windows, wherein a child application window is located relative to an associated parent application window, and wherein at least a part of the child application window does not overlie the parent application window.

13. The method of claim 1, wherein the protocol further includes:
   a framework adapter application programming interface layer configured to provide a specific library to run the application;
   a surface compositor layer configured to draw the at least two of the application windows into the buffer; and
   a context management application programming interface layer configured to provide a scene engine for the at least two of the application windows and to draw the at least two of the application windows on a display screen.

14. A computer program product stored on a non-transitory computer readable medium including computer executable code for presenting image data, the computer program product comprising:
   computer readable code to configure an operating system of an embedded system based on a protocol provided between application windows and a window manager, each of the application windows associated with an application executed by the operating system, the protocol including a port layer configured to permit the embedded system to execute the application, a frame;
   computer readable code to store display content of at least two of the application windows in one buffer;
   computer readable code to composite the at least two of the application windows in the buffer; and
   computer readable code to output data of the buffer for display of the at least two of the application windows based on the compositing, wherein a drawing application programming interface is specified for the application to directly access graphics hardware of the embedded system via an Embedded-System Graphics Library (EGL) interface-implemented driver layer based on the specified drawing application programming interface, the driver layer including one or more drivers configured to allow the application to directly access the graphics hardware of the embedded system.

15. The computer program product of claim 14, wherein the embedded system is a multi-process graphics system.

16. The computer program product of claim 14, wherein the protocol exposes the specified application programming interface to each layer of the protocol including application and application libraries of the embedded system.

17. The computer program product of claim 14, wherein the protocol includes a remote procedure call protocol.

18. The computer program product of claim 14, wherein the protocol provides framework adaption to adapt display framework of an application for display by the window manager.

19. The computer program product of claim 14, wherein the protocol provides surface management to provide drawing of the application windows.

20. The computer program product of claim 14, wherein the protocol provides a framework adapter to provide application libraries.

21. The computer program product of claim 14, wherein the buffer relates to a screen buffer for providing graphic and video output.

22. The computer program product of claim 14, wherein an application window relates to a viewing area for display of a graphical user interface of an application.

23. The computer program product of claim 14, wherein the compositing of the at least two of the application windows is double buffered and provides tear free window content.

24. The computer program product of claim 14, wherein the compositing provides full three dimensional (3D), emulated 3D and two-dimensional (2D) content.

25. The computer program product of claim 14, further comprising computer readable code to use a hierarchical scene graph to composite the at least two of the application windows to the screen, a hierarchy of the scene graph being determined on a parent-child relationship of the at least two of the application windows, wherein a child application window is located relative to an associated parent application window, and wherein at least a part of the child application window does not overlie the parent application window.

26. The computer program product of claim 14, wherein the protocol further includes:
   a framework adapter application programming interface layer configured to provide a specific library to run the application;
   a surface compositor layer configured to draw the at least two of the application windows into the buffer; and
   a context management application programming interface layer configured to provide a scene engine for the at least two of the application windows and to draw the at least two of the application windows on a display screen.

27. A device comprising:
   a memory string an operating system of an embedded system; and
   a processor coupled to the memory, the processor configured to:
      configure the operating system of the embedded system based on a protocol provided between application windows and a window manager, each of the application windows associated with an application executed by the operating system, the protocol including a port layer configured to permit the embedded system to execute the application;
      control storing of display content of at least two of the application windows in one buffer;
      composite the at least two of the application windows in the buffer; and
      control output data of the buffer for display of the at least two of the application windows based on the compositing, wherein a drawing application programming interface is specified for the application to directly access graphics hardware of the embedded system via an Embedded-System Graphics Library (EGL) interface-implemented driver layer based on the specified drawing application programming interface, the driver layer including one or more drivers configured to allow the application to directly access the graphics hardware of the embedded system.

28. The device of claim 27, wherein the device relates to one or more of a display device, personal communication device, handheld computing device, and computing device in general.

29. The device of claim 27, wherein the device processor is an embedded system.

30. The device of claim 27, wherein the processor is further configured to use a hierarchical scene graph to composite the at least two of the application windows to the screen, a hierarchy of the scene graph being determined on a parent-child relationship of the at least two of the application windows, wherein a child application window is located relative to an associated parent application window, and wherein at least a part of the child application window does not overlie the parent application window.

31. The device of claim 27, wherein the protocol further includes:
- a framework adapter application programming interface layer configured to provide a specific library to run the application;
- a surface compositor layer configured to draw the at least two of the application windows into the buffer; and
- a context management application programming interface layer configured to provide a scene engine.

* * * * *